US009623955B2

(12) United States Patent
Trautmann et al.

(10) Patent No.: US 9,623,955 B2
(45) Date of Patent: Apr. 18, 2017

(54) COMPOSITE REINFORCEMENT COMPONENT, STRUCTURAL ELEMENT, AIRCRAFT OR SPACECRAFT AND METHOD FOR PRODUCING A COMPOSITE REINFORCEMENT COMPONENT

(71) Applicant: Airbus Operations GmbH, Hamburg (DE)

(72) Inventors: Christian Trautmann, Berlin (DE); Oliver Seack, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 387 days.

(21) Appl. No.: 14/209,459

(22) Filed: Mar. 13, 2014

(65) Prior Publication Data
US 2014/0295113 A1    Oct. 2, 2014

(30) Foreign Application Priority Data
Mar. 27, 2013    (EP) ..................................... 13161415

(51) Int. Cl.
*B64C 9/02*    (2006.01)
*B29C 70/30*    (2006.01)
(Continued)

(52) U.S. Cl.
CPC ............... *B64C 9/02* (2013.01); *B29C 70/30* (2013.01); *B64C 1/00* (2013.01);
(Continued)

(58) Field of Classification Search
None
See application file for complete search history.

(56) References Cited

U.S. PATENT DOCUMENTS 3,101,290 A * 8/1963 Paul ..................... B29C 66/1142
156/137
3,622,415 A * 11/1971 Kunsman .................. D21F 1/12
139/383 A
(Continued)

FOREIGN PATENT DOCUMENTS

DE     102008038426 A1 *  3/2010   ......... B29C 65/5057
DE     102009043103           3/2011
(Continued)

OTHER PUBLICATIONS

European Search Report, Sep. 9, 2013.

*Primary Examiner* — Jeff Vonch
(74) *Attorney, Agent, or Firm* — Greer, Burns & Crain Ltd.

(57) ABSTRACT

A composite reinforcement component for an aircraft or spacecraft, including a first element assembly aligned in a first extension plane, and a second element assembly aligned in a second, perpendicular, extension plane, the second element assembly intersecting the first element assembly at an intersection of the first and second extension planes. The first and second element assembly each have a pair of staggered comb components. Each comb component includes a base and a plurality of rectangular protrusions extending coplanar from the extension planes of the respective element assembly. The rectangular protrusions form comb teeth of one comb component which are overlapping with comb teeth of the other comb component of the pairs of comb components. The comb teeth of the first element assembly are offset along the intersection by a single comb tooth width with respect to the comb teeth of the second element assembly.

15 Claims, 5 Drawing Sheets

(a)

(b)

(51) Int. Cl.
  *B64C 1/00* (2006.01)
  *B32B 3/24* (2006.01)
  *B32B 5/12* (2006.01)
  *B32B 5/26* (2006.01)
  B32B 3/26 (2006.01)
  B29C 65/00 (2006.01)
  B32B 3/10 (2006.01)
  B29L 31/30 (2006.01)
  B29L 31/00 (2006.01)

(52) U.S. Cl.
  CPC .. *B29C 66/12221* (2013.01); *B29C 66/12821* (2013.01); *B29C 66/12822* (2013.01); *B29L 2031/001* (2013.01); *B29L 2031/3076* (2013.01); *B29L 2031/727* (2013.01); *B32B 3/10* (2013.01); *B32B 3/266* (2013.01); *B32B 5/12* (2013.01); *B32B 5/26* (2013.01); *Y02T 50/433* (2013.01); *Y10T 29/49622* (2015.01); *Y10T 428/13* (2015.01); *Y10T 428/192* (2015.01); *Y10T 428/195* (2015.01); *Y10T 428/197* (2015.01)

(56) References Cited

U.S. PATENT DOCUMENTS

| | | | | |
|---|---|---|---|---|
| 3,995,081 A * | 11/1976 | Fant | B29C 70/865 | 244/123.3 |
| 4,201,815 A * | 5/1980 | Weiland | B64C 27/33 | 428/105 |
| 4,586,226 A | 5/1986 | Fakler et al. | | |
| 4,671,470 A | 6/1987 | Jonas | | |
| 4,715,560 A | 12/1987 | Loyek | | |
| 4,813,202 A * | 3/1989 | Anderson | B64C 1/12 | 244/131 |
| 4,875,795 A * | 10/1989 | Anderson | B64C 1/12 | 244/123.3 |
| 4,892,435 A * | 1/1990 | Anderson | B64C 3/26 | 244/132 |
| 4,893,964 A * | 1/1990 | Anderson | B64C 3/26 | 244/123.3 |
| 4,904,109 A * | 2/1990 | Anderson | B64C 1/12 | 244/132 |
| 4,909,655 A * | 3/1990 | Anderson | B29D 99/0014 | 244/132 |
| 5,342,679 A * | 8/1994 | Aochi | B29C 53/8091 | 428/113 |
| 5,357,728 A * | 10/1994 | Duncanson | A47B 47/042 | 403/381 |
| 5,474,635 A * | 12/1995 | Jacob | B29C 37/0082 | 156/163 |
| 5,506,018 A * | 4/1996 | Jacob | B29C 37/0082 | 428/113 |
| 5,776,582 A * | 7/1998 | Needham | B32B 3/06 | 428/116 |
| 5,832,689 A * | 11/1998 | Curll | A47B 47/0041 | 403/170 |
| 7,731,817 B2 * | 6/2010 | Hethcock | B29C 53/40 | 156/258 |
| 8,039,069 B2 * | 10/2011 | Buchin | B29B 11/16 | 428/33 |
| 8,642,151 B2 * | 2/2014 | Goering | B29B 11/16 | 428/120 |
| 2006/0162277 A1 * | 7/2006 | Schultz | F16B 12/125 | 52/741.4 |
| 2009/0148647 A1 * | 6/2009 | Jones | B29C 70/30 | 428/58 |
| 2010/0148008 A1 | 6/2010 | Hernando et al. | | |
| 2010/0221485 A1 * | 9/2010 | Vance | B32B 18/00 | 428/99 |
| 2010/0264271 A1 * | 10/2010 | Cortes | B64C 1/26 | 244/131 |
| 2010/0272954 A1 * | 10/2010 | Roming | B64C 1/064 | 428/138 |
| 2010/0301165 A1 * | 12/2010 | Gross | B64C 1/26 | 244/121 |
| 2011/0168324 A1 * | 7/2011 | Ender | B29C 33/301 | 156/243 |
| 2012/0151745 A1 * | 6/2012 | Kuntz | E04C 2/423 | 29/525.01 |
| 2012/0308770 A1 * | 12/2012 | Eli-Eli | B29C 70/22 | 428/120 |
| 2013/0011586 A1 * | 1/2013 | Landry | B29C 65/5078 | 428/34.1 |
| 2013/0084422 A1 * | 4/2013 | Thable | B64C 1/069 | 428/137 |
| 2013/0094898 A1 * | 4/2013 | Seack | B64C 1/00 | 403/270 |
| 2013/0099062 A1 * | 4/2013 | Seack | B23P 11/00 | 244/213 |
| 2013/0115429 A1 * | 5/2013 | Valle | B29C 70/30 | 428/172 |
| 2013/0316131 A1 * | 11/2013 | Oefner | B29D 99/0014 | 428/121 |

FOREIGN PATENT DOCUMENTS

| | | | | |
|---|---|---|---|---|
| FR | 2710871 A1 * | 4/1995 | | B29C 65/5042 |
| FR | 2718074 A1 * | 10/1995 | | B29C 66/721 |
| JP | 10219853 A * | 8/1998 | | |
| WO | WO 2015067543 A1 * | 5/2015 | | B29C 70/48 |

* cited by examiner

COMPOSITE REINFORCEMENT COMPONENT, STRUCTURAL ELEMENT, AIRCRAFT OR SPACECRAFT AND METHOD FOR PRODUCING A COMPOSITE REINFORCEMENT COMPONENT

CROSS-REFERENCES TO RELATED APPLICATIONS

This application claims benefit of and priority to the European Patent Application No. 13 161 415.8, filed Mar. 27, 2013, the entire disclosures of which is incorporated herein by way of reference.

FIELD OF THE INVENTION

The present invention relates to a composite reinforcement component, a structural element comprising a composite reinforcement component, an aircraft or spacecraft comprising a structural element which includes a composite reinforcement component, and a method for producing a composite reinforcement component.

BACKGROUND OF THE INVENTION

Aircraft components like flaps, spoilers, ailerons, rudders, elevators as well as intersecting components of an aircraft fuselage or wing structures require solutions with considerable out-of-plane strengths to withstand the loads introduced into the connected components. For example, in flaps the interface loads are usually introduced into ribs joined to a shell component of closed box structure of the flap body. Both of those structures are carrying loads predominantly in the main direction of the extension of the structures. Thus, in the intersection or connection regions of such structures, the planes of the force flows in each structure are intersecting as well.

This leads to specific load introduction requirements. Conventional composites produced by a ply-by-ply stack are usually not able to provide large out-of-plane strengths. On the other hand, isotropic materials like metal that are able to carry loads in three dimensions need to be provided with cut-outs, holes, vias or recesses in order to bolt or rivet them to intersecting components. In those cases, reinforcement measures need to be taken to maintain the structural integrity potentially leading to increased weight and manufacturing complexity.

Hitherto, several attempts have been made to improve the reinforcement of intersecting structural components. Document US 2010/0148008 A1 discloses a load introduction element of this type made of fiber composite material. Document DE 10 2009 043 103 A1 discloses a fiber composite structure comprising at least three fiber composite arms extending from a branching point. Document U.S. Pat. No. 4,715,560 A discloses a composite cruciform structure for joining intersecting structural members of an airframe of an aircraft. Document U.S. Pat. No. 4,586,226 A discloses a load transfer structure with intersecting webs formed of laminated sheets and fiber strands.

SUMMARY OF THE INVENTION

One idea of the invention is therefore to provide solutions for load introduction into intersecting structural components which avoids high manufacturing costs and complexity, which reduces the weight of the load introduction elements and which does not require separate reinforcement means for reinforcing the structural integrity of the intersecting structural components.

A first aspect of the invention is directed to a composite reinforcement component for an aircraft or spacecraft, comprising a first element assembly being aligned in a first plane of extension, and a second element assembly being aligned in a second plane of extension generally perpendicular to the first plane of extension, the second element assembly intersecting the first element assembly at a line of intersection of the first and second planes of extension. The first and second element assembly each comprise at least one pair of staggered comb components, each of the comb components including a base portion and a plurality of generally rectangular protrusions extending coplanar from the respective planes of extension of the respective element assembly. The rectangular protrusions thereby form comb teeth portions of one comb component of the pairs of comb components which are overlapping with comb teeth portions of the other comb component of the pairs of comb components. The comb teeth portions of the first element assembly are offset along the line of intersection by a single comb tooth width with respect to the comb teeth portions of the second element assembly.

A second aspect of the invention is directed to a structural element, comprising a composite reinforcement component according to the first aspect of the invention, and a plurality of outer plies being formed on the outer surface of the composite reinforcement component, the outer plies being bent in the region of the line of intersection of the composite reinforcement component.

A third aspect of the invention is directed to a method for producing a composite reinforcement component, comprising the steps of assembling at least two first comb components, each of the first comb components including a base portion and a plurality of generally rectangular protrusions by stacking a plurality of plies, wherein the rectangular protrusions form first comb teeth portions of the first comb components, assembling at least two second comb components, each of the second comb components including a base portion and a plurality of generally rectangular protrusions by stacking a plurality of plies, wherein the rectangular protrusions form second comb teeth portions of the second comb components, and wherein the first comb teeth portions are offset by a single comb tooth width with respect to the second comb teeth portions, aligning the first comb teeth portions of a first one of the first comb components with the second comb teeth portions of a first one of the second comb components, so that the first comb component is aligned in a first plane of extension and the second comb component is aligned in a second plane of extension generally perpendicular to the first plane of extension, overlapping the first comb teeth portions of a second one of the first comb components with the first comb teeth portions of the first one of the first comb components, so that the second one of the first comb components coplanar extends with the first one of the first comb components, and overlapping the second comb teeth portions of a second one of the second comb components with the second comb teeth portions of the first one of the second comb components, so that the second one of the second comb components coplanar extends with the first one of the second comb components.

One of the ideas on which the present invention is based is to provide a composite load introduction fitting in generally cruciform shape that can be manufactured integrally with the main composite structure, for example of a structural element such as a closed box structure. To that end, it is proposed to form comb components having comb-like protrusions that respectively overlap with a counterpart in the same plane of extension and that interlock with comb-like protrusions of comb components formed in a perpendicular plane of extension.

This enables the reinforcement component to be manufactured integrally from composite materials, thereby avoiding additional manufacturing steps of reinforcing, insulating, milling, drill, shimming or riveting for metallic fittings.

Moreover, due to the obviation of forming recesses or cut-outs, the mechanical strength and stability of the reinforcement component, is enhanced without the need for extra reinforcement measures which would have been needed for metallic reinforcement components. The force flows are led on straight paths through the proposed reinforcement component, which reduces the out-of-plane loading of the surrounding composite box structure, especially the out-of-plane loading of the outer plies, which are bent in the region of the line of intersection. This may lead to cost savings in manufacturing as well as weight reduction compared to metallic load introduction fittings.

According to an embodiment of the composite reinforcement component, the comb components may be preformed by a plurality of stacked plies.

According to a further embodiment of the composite reinforcement component, the stacked plies may comprise semi-finished textiles, woven fabrics, unidirectional reinforced fabrics, non-crimp fabrics, fiber reinforced plastics or unidirectional reinforced tapes. All before mentioned textiles can be made from glass, aramide, carbon, boron or similar structural fibers. All before mentioned textiles can be used either in dry or in pre-impregnated forms. The pre-impregnation can be done with viscous thermoset resins, which will be cured in a later curing cycle at elevated temperatures or thermoplastic matrices, which melt and become formable at elevated temperatures.

According to a further embodiment of the composite reinforcement component, the stacked plies may be staggered in length in the region of the comb teeth portions so that the overlapping comb teeth portions of pairs of comb components form stepped-lap joints. According to an alternative embodiment, the stacked plies may be staggered in length in the region of the base portions, thereby forming a stepped joint edge. According to another alternative embodiment, the stacked plies may be equal in length in the region of the base portions, thereby forming a butt joint edge. According to yet another alternative embodiment, the stacked plies may be staggered in length in the region of the base portions, thereby forming a asymmetric stepped lap-joint edge.

According to an embodiment of the structural element, the plurality of outer plies may comprise semi-finished textiles, woven fabrics, unidirectional reinforced fabrics, non-crimp fabrics, fiber reinforced plastics or unidirectional reinforced tapes.

According to another embodiment of the structural element, the structural element may further comprise at least one gusset filler element being arranged in the space between the element assemblies and the curvature of the respective outer ply.

According to a further embodiment of the structural element, the structural element may be a closed box structure, in particular for a flap, a spoiler, an aileron, a rudder or an elevator of an aircraft.

BRIEF DESCRIPTION OF THE DRAWINGS

The invention will be explained in greater detail with reference to exemplary embodiments depicted in the drawings as appended.

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION OF THE PREFERRED EMBODIMENTS

Figure 1:
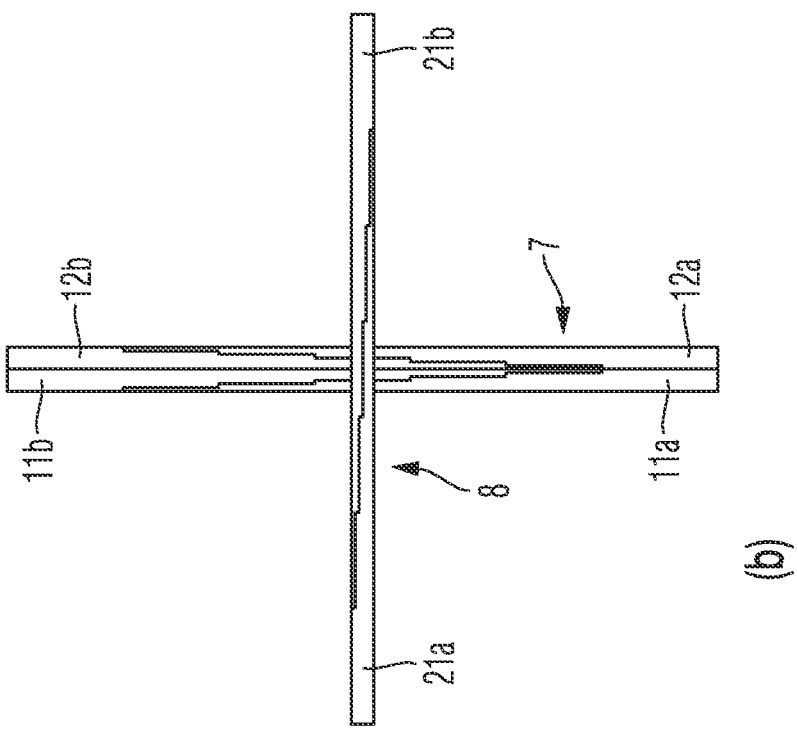
FIG. 1 schematically illustrates a perspective view (a) and a side view (b) of a composite reinforcement component according to an embodiment of the present invention.
Figure 1:
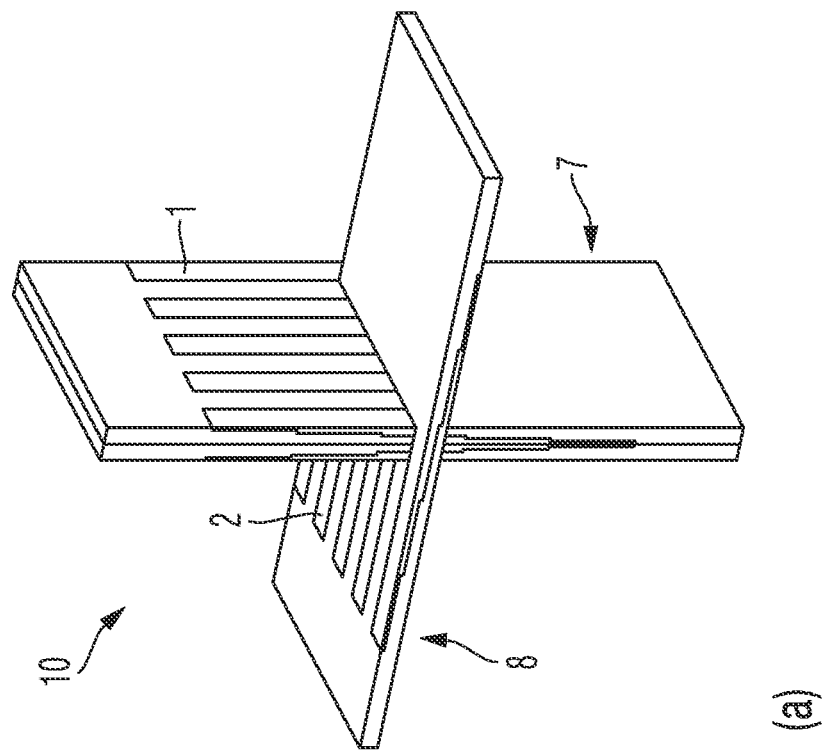

In the figures, like reference numerals denote like or functionally like components, unless indicated otherwise. Any directional terminology like "top", "bottom", "left", "right", "above", "below", "horizontal", "vertical", "back", "front" and similar terms are merely used for explanatory purposes and are not intended to delimit the embodiments to the specific arrangements as shown in the drawings.

Although specific embodiments have been illustrated and described herein, it will be appreciated by those of ordinary skill in the art that a variety of alternate and/or equivalent implementations may be substituted for the specific embodiments shown and described without departing from the scope of the present invention. Generally, this application is intended to cover any adaptations or variations of the specific embodiments discussed herein.

Composites in the sense of the present invention comprise material assemblies combining at least two components with significantly different material characteristics. Composites in the sense of the present invention may for example comprise glass fiber reinforced plastics, carbon-fiber reinforced plastics, carbon nanotube reinforced plastics or similar materials. Composites may include textiles that can be made from glass, aramide, carbon, boron or similar structural fibers. Those composites may for example be used either in dry or in pre-impregnated forms. The pre-impregnation may be done with viscous thermoset resins, which will be cured in a later curing cycle at elevated temperatures or thermoplastic matrices, which melt and become formable at elevated temperatures.

FIG. 1 shows a schematic illustration of a composite reinforcement component 10. As shown in view (a), the composite reinforcement component 10 generally has a cruciform shape, i.e., a shape of two substantially rectilinearly aligned element assemblies 7 and 8 intersecting each other at a line of intersection defined by the planes of extension of each of the element assemblies.

Each of the element assemblies 7 and 8 comprises at least two comb components 11a, 11b, 12a, 12b, 21a and 21b, as shown in side view (b) of FIG. 1. For example, the horizontally aligned element assembly 8 is formed by two comb components 21a and 21b which are attached to each other via comb teeth 2. The comb teeth portions 2 of each of the comb components 21a and 21b are formed by generally rectangular shaped protrusions extending coplanar within the plane of extension of the comb components 21a and 21b from an integral base portion of the comb components 21a and 21b, respectively. The comb teeth portions 2 are built in each case to overlap with the respective counterpart comb component 21a and 21b in such a manner that corresponding ones of the comb teeth 2 may be assembled with an offset to produce a rectangular opening 9 formed between the two base portions of the comb components 21a and 21b.

The rectangular opening 9 formed in this way may be used for the vertically aligned comb components 11a and 11b to stick through. To this end, the vertically aligned comb components 11a and 11b may be formed in a similar manner to the comb components 21a and 21b, i.e., by attaching the comb components 11a and 11b to each other via comb teeth 1. The comb teeth portions 1 of each of the comb components 11a and 11b are also formed by generally rectangular shaped protrusions extending coplanar within the plane of extension of the comb components 11a and 11b from an integral base portion of the comb components 11a and 11b, respectively. The comb teeth portions 1 are built in each case to overlap with the respective counterpart comb component 11a and 11b in such a manner that corresponding ones of the comb teeth 1 may be assembled with an offset to produce a rectangular opening 9 formed between the two base portions of the comb components 11a and 11b. Those openings are in turn used to form an aperture for the comb teeth 2 of the horizontally aligned comb components 21a and 21b.

As exemplarily shown in FIG. 1, the vertically aligned element assembly 7 includes two pairs of comb components 11a, 11b and 12a, 12b which are laminated back to back to each other. Of course, the number of pairs of comb components making up either one of the element assemblies 7 and 8 is not limited to one or two, but more than two pairs of comb components may be used to form the element assemblies 7 and 8. The number of pairs of comb components used to form the element assemblies 7 and 8 may differ between the horizontally and vertically aligned element assemblies. Depending on the number of pairs of comb components used, the width of the rectangular openings or apertures formed between the base portions of the respective perpendicularly arranged element assembly may be adjusted to the overall width of the pairs of comb components used for the other element assembly, for example by adjusting the length and overlap portions of the comb teeth portions 1 and 2, respectively.

The comb components 11a, 11b and 12a, 12b or 21a and 21b, respectively are staggered with respect to their counterpart, i.e., the base portions of the staggered comb components are located on different sides of the composite reinforcement component 10 with regard to the line of intersection. This means that the comb teeth portions 1 and 2 of paired comb components 11a, 11b and 12a, 12b or 21a and 21b are facing towards each other and are overlapping in an overlapping region to form the element assembly 7 and 8, respectively. The comb teeth portions 1 of the first element assembly 7 are offset along the line of intersection by a single comb tooth width with respect to the comb teeth portions 2 of the second element assembly 8, so that the comb teeth portions 1 interlock with the comb teeth portions 2.

The element assemblies 7 and 8 may be formed as preforms so that the whole composite reinforcement component 10 may be assembled in a preform state and cured within the final structural element.

A typical application of a composite reinforcement component 10 of FIG. 1 may be a beam-like or box structure which is during normal use bent by external loads like aerodynamic lift forces perpendicular to the spanwise extension of the beam-like or box structure. The beam-like or box structure then experiences spanwise forces due to the bending. Particularly at interfaces where the beam-like or box structure is to be mounted on support structures the resulting interface loads have to be transferred through the coupling interface of the support structure in spanwise direction.

In order to mechanically stabilize the coupling interface between the beam-like or box structure and the support structure, the peeling forces on the beam-like or box structure resulting from a linear combination of the lift forces with the spanwise forces need to be taken into account. This means that any load introduction fitting used to couple the beam-like structure with the support structure needs to be reinforced against out-of-plane forces. Peeling forces may be regarded as out-of-plane forces that are prone to dismantle or separate parts, especially plies, from each other.

The cruciform shaped composite reinforcement component 10 of FIG. 1 directly transfers skin forces and lift forces in the respective planes of extensions of the different element assemblies 7 and 8, i.e., peeling forces cannot occur within the composite reinforcement component 10. This leads to a significant reduction of peeling stresses between the outer plies 101.

Figure 2:
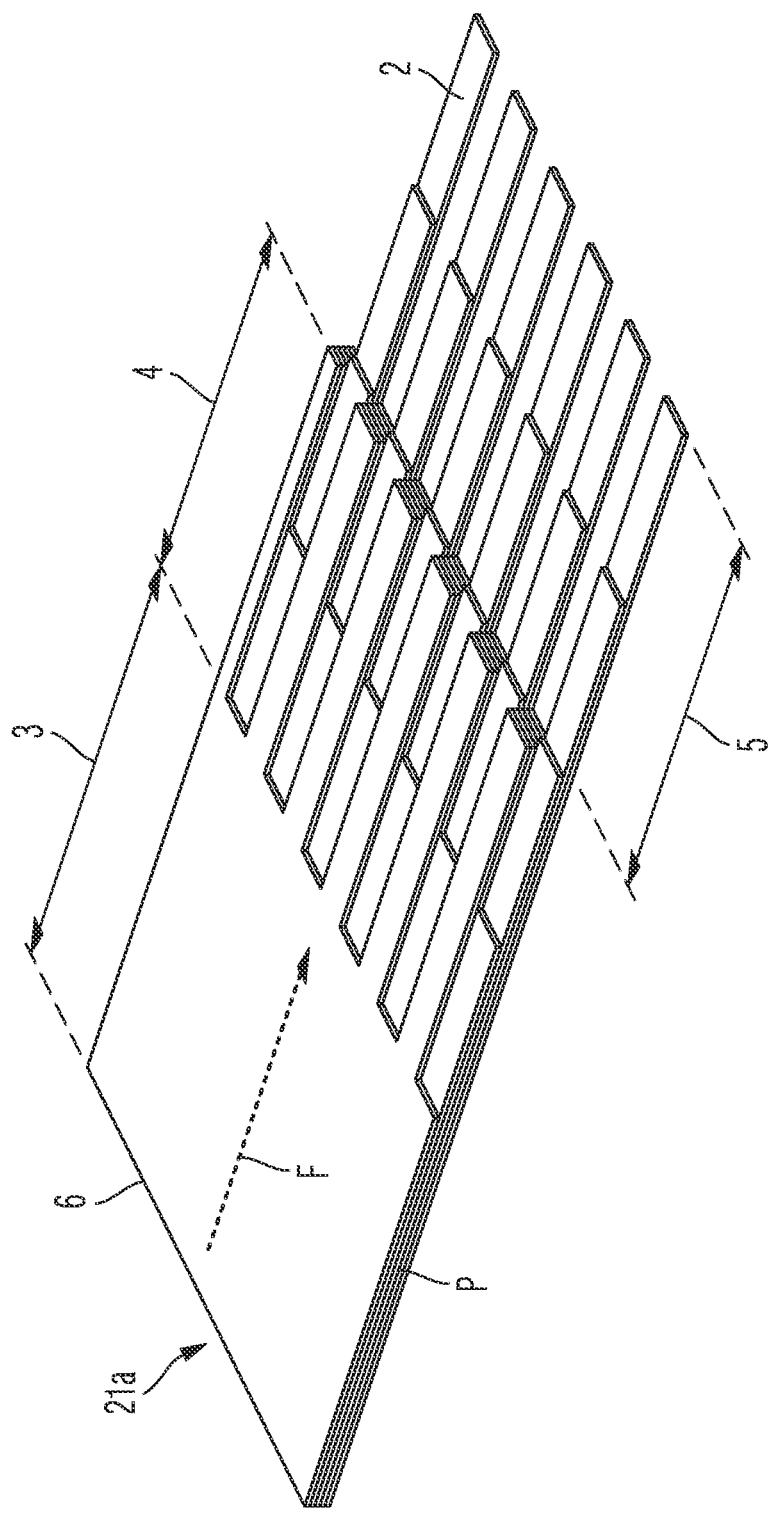
FIG. 2 schematically illustrates a perspective view of a single comb component used to manufacture a composite reinforcement component according to a further embodiment of the present invention.

FIG. 2 shows a schematic illustration of a single comb component of the composite reinforcement component 10, exemplarily depicted as comb component 21a. However, the other comb components 11a, 11b, 12a, 12b and 21b of FIG. 1 may be formed in an analogous manner as shown in the FIG. 2.

The comb component 21a is made up from a plurality of stacked plies P which may comprise semi-finished textiles, unidirectional (UD) reinforced fabrics, non-crimp fabrics (NCF), carbon-fiber reinforced plastics (CFRP) or unidirectional reinforced tapes. The number of plies P is shown exemplarily as four, however, any number of stacked plies P may be selected depending on the reinforcement strength and desired characteristics of the comb component 21a. The stacked plies P may include fibers running generally in a fiber orientation F within the plane of extension of the comb component 21a. However, any other material with different fiber orientations may be used as well, again depending on the desired characteristics of the comb component 21a.

The comb component 21a generally includes a base portion 3, a first attachment region 4 and a second attachment region 5. The base portion 3 is a region where all plies P are fully stacked on top of each other. The first and second attachment regions 4 and 5 are regions where indentations and recesses are formed in aforementioned comb-like protrusion geometry. Within the first attachment region 4 some of the plies P are recessed in a staggered manner creating a stepped-lap joint. Within the second attachment region 5 only part of the plies P are formed with such a length that generally rectangular shaped protrusions are formed extending coplanar with the base portion 3 and the first attachment region 4. Again, the protrusions are graduated in length to create a stepped-lap joint as well.

The attachment regions 4 and 5 are formed in such a way that a respective second attachment region 5 of a first comb component 21a may be fitted onto a corresponding first attachment region 4 of a second, similarly built comb component, thereby forming a uniform and flush surface from the base portion 3 of the first comb component over the two attachment regions 4 and 5 to the base portion 3 of the second comb component. The staggered manner of overlapping the attachment regions 4 and 5 of a pair of comb components 21a results in the formation of one of the element assemblies 7 and 8 in FIG. 1.

For the formation of the respective other element assembly 7 or 8, the rectangular shaped protrusions of the comb components in FIG. 2 may be offset by a single comb tooth width, i.e., the width of one of the rectangular shaped protrusions. That way, the comb teeth portions of the element assemblies 7 and 8 may be interlocked without the need for additional cut-outs or recesses.

Figure 3:
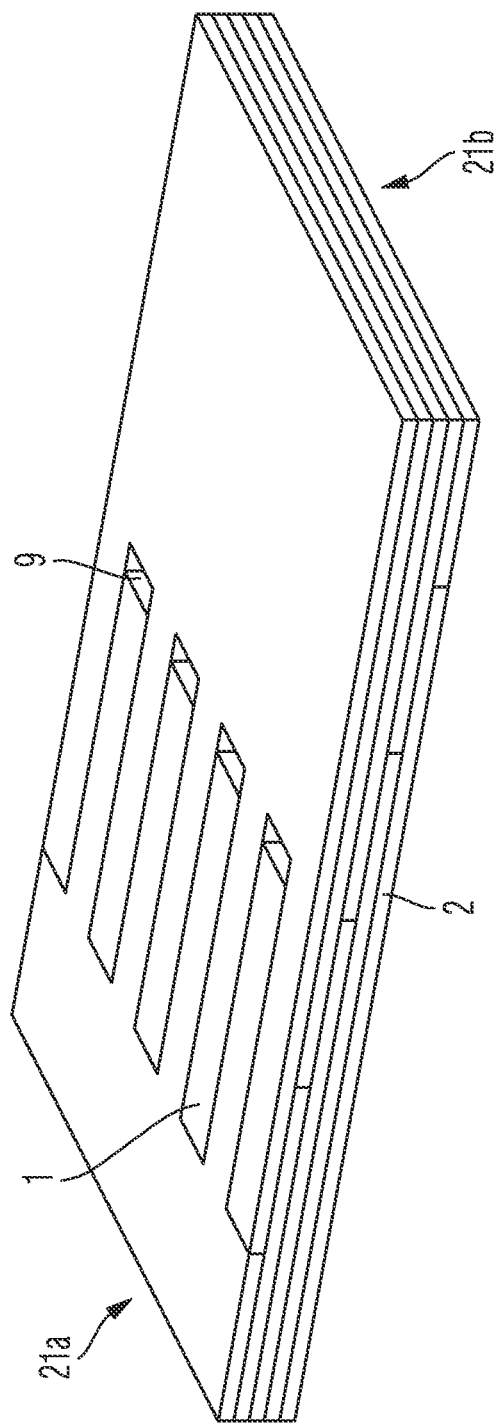
FIG. 3 schematically illustrates a perspective view of a pair of assembled comb components used to manufacture a composite reinforcement component according to a further embodiment of the present invention.

FIG. 3 schematically illustrates a perspective view of a pair of assembled comb components 21a and 21b used to manufacture a composite reinforcement component, for example the composite reinforcement component 10 of FIG. 1. As shown in FIG. 3, the comb teeth portions 1 and 2 of the two comb components 21a and 21b align coplanar and are offset with regard to each other so that a rectangular opening 9 is formed between the two base portions 3 of the comb components 21a and 21b. Those rectangular openings 9 preferably have a dimension that is adapted to receive another pair of similarly shaped comb components 21a and 21b interlocking perpendicular to the plane of extension of the comb components 21a and 21b in order to form a composite reinforcement component of substantially cruciform shape.

Figure 4:
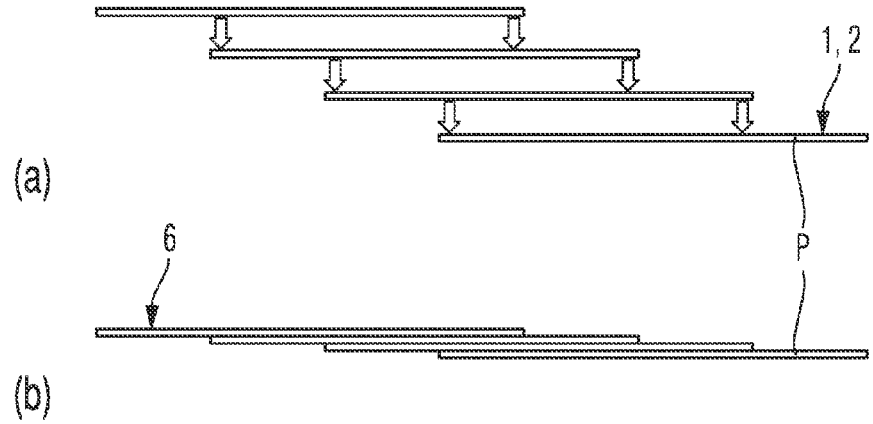
FIG. 4 schematically illustrates steps of assembling a comb component used to manufacture a composite reinforcement component according to a further embodiment of the present invention.

FIG. 4 shows illustrative steps (a) and (b) of a procedure of assembling one of the comb components 11a, 11b, 12a, 12b, 21a or 21b of FIGS. 1 to 3. The plies P are overlaid on top of each other as indicated by the arrows. The edge side 2 is forming the comb teeth portion 2 where a stepped-lap joint is formed as shown in FIG. 2.

The joint edge side 6 opposite to the comb teeth portion 2 is in the example of FIG. 4 (b) a stepped-lap joint as well. This may be done by staggering the plies in length of the edge side 6. The stepped-lap joint may be formed in order to more easily join the joint edge side 6 to adjoining preform elements of a structural component. A stepped-lap joint at the joint edge side 6 may increase the joint strength of the joint with regard to shear failures.

Of course, two of the ply stacks as shown in FIG. 4 (b) may as well be put back-to-back in order to create a symmetric stepped lap-joint in which the uppermost and lowermost plies P stand out of the joint edge side 6 furthest with a staggered arrangement of plies P of successively shorter length towards the middle of the ply stack. A symmetric stepped lap joint has increased resistance to shear failures, but may be formed with more layers of plies P than the asymmetric stepped-lap joint.

Other joint types may be formed on the joint edge side 6 as well, for example a butt joint type as shown in FIG. 2 where all the plies P have the same length on the joint edge side 6 and terminate flush to each other, thereby realizing a blunt edge. Such an edge may be used to create a single-lap joint or double-lap joint with adjoining composite layers of a structural element.

Figure 5:
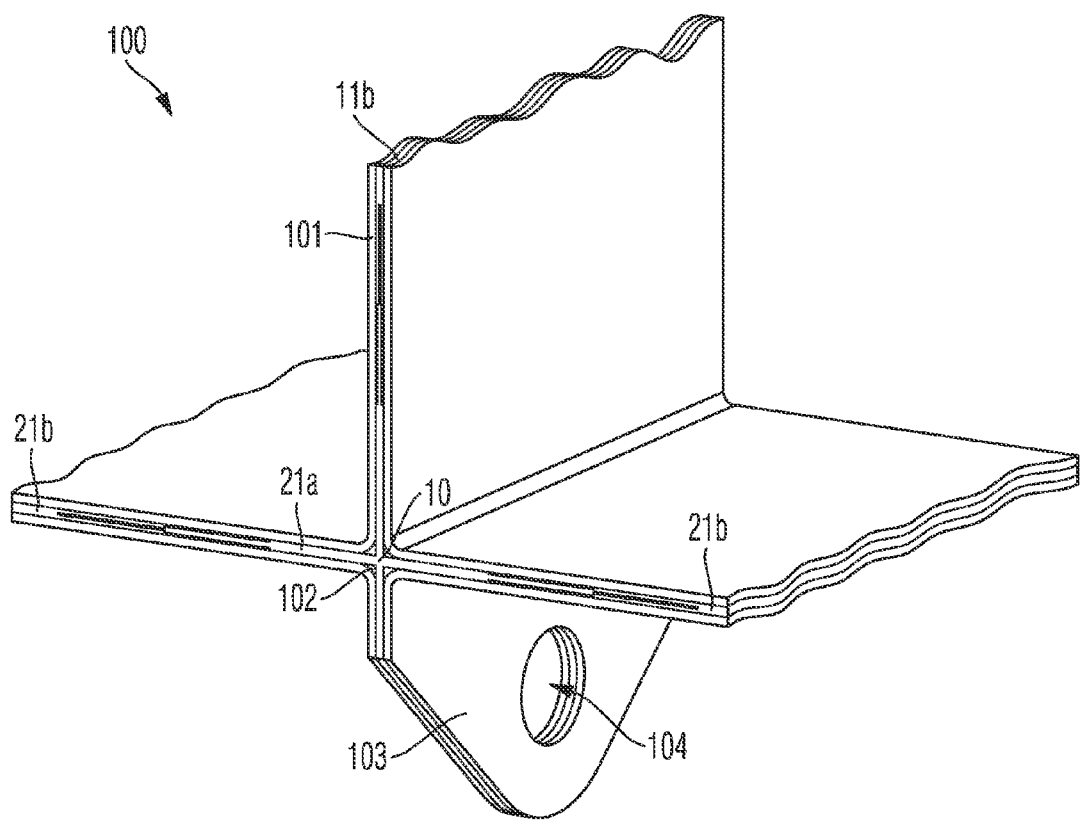
FIG. 5 schematically illustrates a perspective view of a structural element including a composite reinforcement component according to a further embodiment of the present invention.
Figure 6:
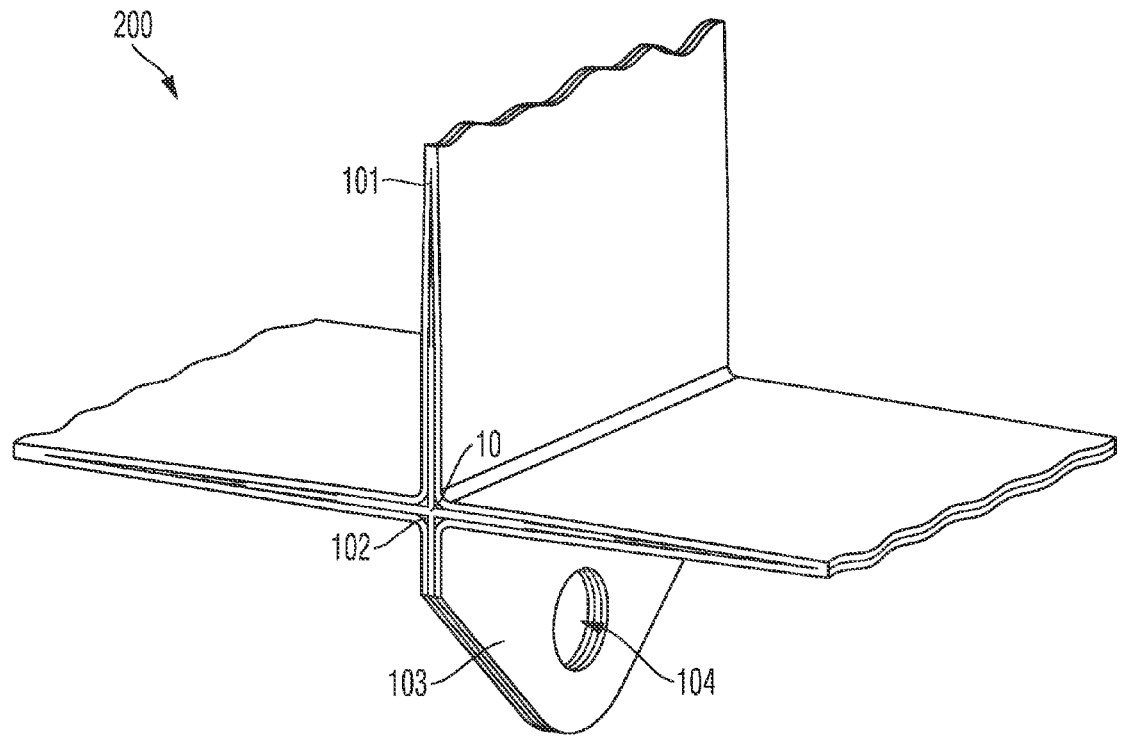
FIG. 6 schematically illustrates a perspective view of yet another structural element including a composite reinforcement component according to a further embodiment of the present invention.

FIGS. 5 and 6 show schematic illustrations of structural elements 100 and 200 which can be considered as smaller parts of for example bigger closed box structures used in flaps, ailerons, rudders, spoilers, elevators or wing boxes of aircraft or spacecraft. The innermost part of the structural elements 100 and 200 is formed as a composite reinforcement component, for example a composite reinforcement component 10 as described in conjunction with FIGS. 1 to 4.

The structural elements 100 and 200 further include a plurality of outer plies 101 which are formed on the outer surface of the composite reinforcement component 10. The outer plies 101 are formed on the composite reinforcement component 10 that they trace the outline of the cruciform shape of the component 10, i.e., the outer plies 101 are so-called L-plies which are bent in the region of the line of intersection of the element assemblies 7 and 8 of the composite reinforcement component 10. This means that an approximately triangular cavity or hollow is formed at the corners of the crossing area of the element assemblies 7 and 8. The outer plies 101 usually follow a curvature of a minimum radius. Those radii usually lie between 1 and 10 mm, for example 5 mm, owing to the stiffness of the layer of outer plies 101, depending on the material and number of layers used. For example, the outer plies 101 may comprise composite materials, such as semi-finished textiles, woven fabrics, unidirectional reinforced fabrics, non-crimp fabrics, carbon-fiber reinforced plastics or unidirectional reinforced tapes.

In order to fill the triangular cavities or hollows, gusset filler elements 102 may be arranged in the space between the element assemblies 7 and 8 and the curvature of the respective innermost outer ply 101. Such gusset fillers may be formed as textile component with fibers in form of a yarn or a braid, which has an approximately triangular cross-section. The main function of the gusset fillers is to avoid resin rich areas inside the structural elements 100 and 200 after curing the preforms with resin. This increases the mechanical strength of the structural elements 100 and 200 as they are less prone to crack under load.

The structural elements 100 and 200 may be provided with a lug 103 on one branch of the cruciform shape which may be used to attach the structural elements 100 and 200 to a support structure (not shown). In order to provide a fastening means, the lug 103 may include a lug via 104 through with a bolt, rivet or spherical bearing may be plugged as fastening component for the support structure.

In FIG. 5, the structural element 100 may include a further layer of inner plies adjoining the composite reinforcement component 10 at the joint edge sides 6. In this embodiment, the joint edge side 6 may be formed as symmetric or asymmetric stepped-lap joint, as described and explained in conjunction with FIG. 4.

In FIG. 6, as an alternative, the composite reinforcement component 10 may be completely embedded within the outer plies 101 obviating the need for additional inner composite plies. In this case, a simple lap joint or a row of simple lap joints may be realized between the outer plies 101 and the element assemblies 7 and 8 of the composite reinforcement component 10. This approach simplifies the manufacturing process since an exact cutting and laying of plies to form the stepped-lap joint is not necessary. On the other hand, the joint strength of a stepped-lap joint as in FIG. 5 is higher than the joint strength of a simple lap joint or a row of simple lap joints as in FIG. 6.

Figure 7:
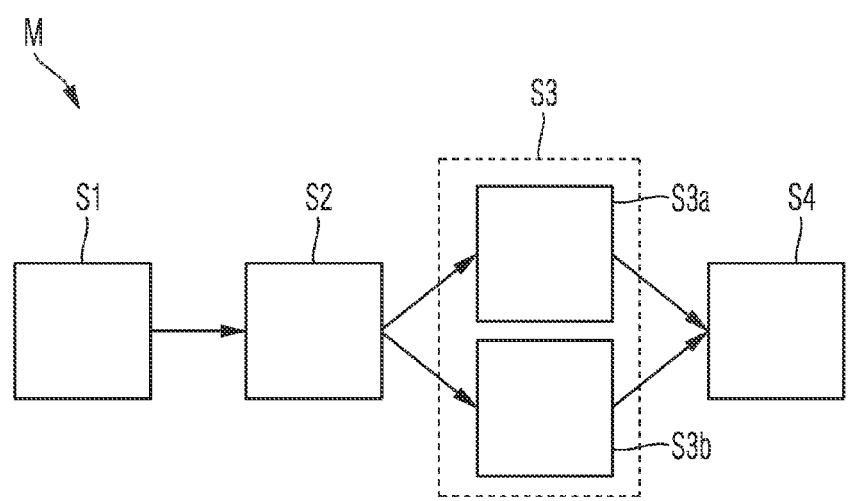
FIG. 7 schematically illustrates a method for producing a composite reinforcement component according to a further embodiment of the present invention.

FIG. 7 schematically illustrates a method M for producing a composite reinforcement component, in particular a composite reinforcement component 10 for a structural element 100 or 200 as depicted in FIGS. 1 to 6.

The method M may involve at S1 assembling at least two first comb components, each of the first comb components including a base portion and a plurality of generally rectangular protrusions. This assembling may be done by stacking a plurality of plies in such a way that the rectangular protrusions form first comb teeth portions of the first comb components. In a similar manner, at S2 the method M may comprise assembling at least two second comb components, each of the second comb components including a base portion, and a plurality of generally rectangular protrusions by stacking a plurality of plies. The rectangular protrusions form second comb teeth portions of the second comb components.

The first comb teeth portions are offset by a single comb tooth width with respect to the second comb teeth portions, in order to be able at S3a to align the first comb teeth portions with the second comb teeth portions of first two of the first and second comb components, respectively. This alignment will be done in such a way that the first comb component is aligned in a first plane of extension and the second comb component is aligned in a second plane of extension which is generally perpendicular to the first plane of extension. At S3a therefore formation of a first half of the final cruciform shape of the composite reinforcement component will be allowed.

At S3b and S4 the final half of the cruciform shape is then assembled by first overlapping the first comb teeth portions of a second one of the first comb components with the first comb teeth portions of the first one of the first comb components, so that the second one of the first comb components coplanar extends with the first one of the first comb components. As a second measure, the second comb teeth portions of a second one of the second comb components may then be overlapped with the second comb teeth portions of the first one of the second comb components, so that the second one of the second comb components coplanar extends with the first one of the second comb components.

Of course, the operations S3a and S3b which are generally indicated as operation S3 of the method M in FIG. 7 may be performed in reverse order as well, that is first a pair of coplanar extending comb components is assembled and then the other pair of coplanar extending comb components is assembled.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification. In particular, the embodiments and configurations described for the composite reinforcement components and structural elements can be applied accordingly to the aircraft or spacecraft according to the invention and the method according to the invention, and vice versa.

The embodiments were chosen and described in order to best explain the principles of the invention and its practical applications, to thereby enable others skilled in the art to best utilize the invention and various embodiments with various modifications as are suited to the particular use contemplated. In the appended claims and throughout the specification, the terms "including" and "in which" are used as the plain-English equivalents of the respective terms "comprising" and "wherein," respectively. Furthermore, "a" or "one" does not exclude a plurality in the present case.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A composite reinforcement component for an aircraft or spacecraft, comprising:
    a first element assembly being aligned in a first plane of extension; and
    a second element assembly being aligned in a second plane of extension generally perpendicular to the first plane of extension, the second element assembly intersecting the first element assembly at a line of intersection of the first and second planes of extension,
    wherein the first and second element assembly each comprise:
        a least one pair of staggered comb components, each of the comb components including a base portion and a plurality of generally rectangular protrusions extending coplanar within the respective plane of extension of the element assembly,
        wherein the rectangular protrusions form comb teeth portions, wherein the comb teeth portions of one comb component of the at least one pair of comb components overlap with the comb teeth portions of the other comb component of the at least one pair of comb components, and
        wherein the comb teeth portions overlap with an offset in a direction along the respective plane of extension such that a rectangular opening is formed between the two base portions of the at least one pair of comb components,
    wherein the comb teeth portions of a first element assembly are offset along the line of intersection by a single comb tooth width with respect to the comb teeth portions of the second element assembly, such that each of the first and second element assembly intersect through the rectangular opening of the other element assembly at the line of intersection.

2. The composite reinforcement component according to claim 1, wherein the comb components are preformed by a plurality of stacked plies.

3. The composite reinforcement component according to claim 2, wherein the stacked plies comprise semi-finished textiles, woven fabrics, unidirectional reinforced fabrics, non-crimp fabrics, carbon-fiber reinforced plastics or unidirectional reinforced tapes.

4. The composite reinforcement component according to claim 2, wherein the stacked plies are staggered in length in the region of the comb teeth portions so that the overlapping comb teeth portions of pairs of comb components form at least one of symmetric and asymmetric stepped-lap joints.

5. The composite reinforcement component according to claim 2, wherein the stacked plies are staggered in length in the region of the base portions, thereby forming at least one of symmetric and asymmetric stepped lap joint edge.

6. The composite reinforcement component according to claim 2, wherein the stacked plies are equal in length in the region of the base portions, thereby forming a butt joint edge.

7. A structural element, comprising:
a composite reinforcement component according to claim 1; and
a plurality of outer plies being formed on the outer surface of the composite reinforcement component, the outer plies being bent in the region of the line of intersection of the composite reinforcement component.

8. The structural element according to claim 7, wherein the plurality of outer plies comprise semi-finished textiles, woven fabrics, unidirectional reinforced fabrics, non-crimp fabrics, carbon-fiber reinforced plastics or unidirectional reinforced tapes.

9. The structural element according to claim 7, further comprising at least one gusset filler element being arranged in the space between the element assemblies and the curvature of the respective outer ply.

10. The structural element according to claim 7, wherein the structural element is a closed box structure.

11. The structural element according to claim 7, wherein the structural element is one of a flap, a spoiler, an aileron, a rudder and an elevator of an aircraft.

12. An aircraft or spacecraft comprising a structural element according to claim 7.

13. A method for producing a composite reinforcement component for an aircraft or spacecraft, comprising:
assembling at least two first staggered comb components, each of the first comb components including a base portion and a plurality of generally rectangular protrusions by stacking a plurality of plies, wherein the rectangular protrusions form first comb teeth portions of the first comb components;
assembling at least two second staggered comb components, each of the second comb components including a base portion and a plurality of generally rectangular protrusions by stacking a plurality of plies, wherein the rectangular protrusions form second comb teeth portions of the second comb components, and wherein the first comb teeth portions are offset by a single comb tooth width with respect to the second comb teeth portions;
performing the following in either order:
aligning the first comb teeth portions of a first one of the first comb components with the second comb teeth portions of a first one of the second comb components, so that the first comb component is aligned in a first plane of extension and the second comb component is aligned in a second plane of extension generally perpendicular to the first plane of extension; and overlapping the first comb teeth portions of a second one of the first comb components with the first comb teeth portions of the first one of the first comb components, so that the second one of the first comb components extends coplanar with the first one of the first comb components, forming a first element assembly, wherein the first comb teeth portions of the first and second ones of the first comb components are offset in a direction along the first plane of extension such that a rectangular opening is formed between the two base portions of the at least two first comb components; and overlapping the second comb teeth portions of a second one of the second comb components with the second comb teeth portions of the first one of the second comb components, so that the second one of the second comb components extends coplanar with the first one of the first comb components, forming a second element assembly, wherein the second comb teeth portions of the first and second ones of the second comb components are offset in a direction along the second plane of extension such that a rectangular opening is formed between the two base portions of the at least two first comb components;
wherein the second element assembly intersects the first element assembly at a line of intersection of the first and second planes of extension, such that each of the first and second element assembly intersect through the rectangular opening of the other element assembly at the line of intersection.

14. The method according to claim 13, wherein the stacked plies comprise semi-finished textiles, woven fabrics, unidirectional reinforced fabrics, non-crimp fabrics, carbon-fiber reinforced plastics or unidirectional reinforced tapes.

15. The method according to claim 14, wherein the stacked plies are staggered in length in the region of the first and second comb teeth portions so that the overlapping comb teeth portions of pairs of first and second comb components form stepped-lap joints.

* * * * *